US010907643B2

(12) United States Patent
Webster et al.

(10) Patent No.: US 10,907,643 B2
(45) Date of Patent: Feb. 2, 2021

(54) PRESS-FIT THRUST BEARING SYSTEM AND APPARATUS

(71) Applicant: Halliburton Energy Services, Inc., Houston, TX (US)

(72) Inventors: Joshua Wayne Webster, Owasso, OK (US); Wesley John Nowitzki, Tulsa, OK (US); Jason Eugene Hill, Catoosa, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 63 days.

(21) Appl. No.: 16/430,253

(22) Filed: Jun. 3, 2019

(65) Prior Publication Data

US 2019/0285079 A1 Sep. 19, 2019

Related U.S. Application Data

(63) Continuation of application No. 15/912,321, filed on Mar. 5, 2018, now Pat. No. 10,359,045.

(Continued)

(51) Int. Cl.
*F04D 29/047* (2006.01)
*F04D 13/10* (2006.01)
(Continued)

(52) U.S. Cl.
CPC ......... *F04D 29/0476* (2013.01); *F04D 1/063* (2013.01); *F04D 3/00* (2013.01);
(Continued)

(58) Field of Classification Search
CPC ............. F04D 29/0413; F04D 29/0473; F04D 29/047; F04D 29/0476; F04D 13/08; F04D 13/10; F16C 2360/44
See application file for complete search history.

(56) References Cited

U.S. PATENT DOCUMENTS 1,642,914 A 9/1927 Whann
2,236,953 A 4/1941 Schott
(Continued)

FOREIGN PATENT DOCUMENTS

CN 102606490 A 7/2012
GB 1437532 A 5/1976

OTHER PUBLICATIONS

International Search Report and Written Opinion dated Jun. 28, 2018; International PCT Application No. PCT/US2018/020954.

*Primary Examiner* — Moshe Wilensky
*Assistant Examiner* — Cameron A Corday
(74) *Attorney, Agent, or Firm* — McGuireWoods LLP

(57) ABSTRACT

A press-fit thrust bearing system and apparatus. A press-fit thrust bearing for an electric submersible pump includes a protruding band extending around a midsection of a bushing, the protruding band extending inward towards a drive shaft, outward towards a diffuser, or both. When extending outwardly, the band is press-fit into the diffuser to prevent dislodgment of the bushing. A non-rotating guide sleeve extends around the bushing above the protruding band, the guide sleeve interlocking with the protruding band to prevent rotation of the bushing. The guide sleeve includes a projection, the protruding band has a channel and the projection mates with the channel to form the interlock. A pair of flanged, rotatable bearing sleeves extend inwards of the single bushing and are keyed to the drive shaft. The top and bottom faces of the bushing serve as thrust handling surfaces.

10 Claims, 7 Drawing Sheets

Related U.S. Application Data

(60) Provisional application No. 62/482,061, filed on Apr. 5, 2017.

(51) Int. Cl.

| | | |
|---|---|---|
| *F16C 35/02* | (2006.01) | |
| *F04D 29/041* | (2006.01) | |
| *F04D 1/06* | (2006.01) | |
| *F16C 17/02* | (2006.01) | |
| *F16C 33/08* | (2006.01) | |
| *F04D 3/00* | (2006.01) | |
| *F16C 17/26* | (2006.01) | |
| *F16C 33/04* | (2006.01) | |
| *F16C 35/10* | (2006.01) | |
| *F04D 13/08* | (2006.01) | |

(52) U.S. Cl.
CPC ......... *F04D 13/10* (2013.01); *F04D 29/0413* (2013.01); *F04D 29/0473* (2013.01); *F16C 17/02* (2013.01); *F16C 17/26* (2013.01); *F16C 33/08* (2013.01); *F16C 35/02* (2013.01); *F04D 13/08* (2013.01); *F16C 33/043* (2013.01); *F16C 35/10* (2013.01); *F16C 2204/60* (2013.01); *F16C 2206/40* (2013.01); *F16C 2206/56* (2013.01); *F16C 2226/12* (2013.01); *F16C 2226/76* (2013.01); *F16C 2240/46* (2013.01); *F16C 2240/70* (2013.01); *F16C 2300/34* (2013.01); *F16C 2360/44* (2013.01)

(56) References Cited

U.S. PATENT DOCUMENTS

| | | | |
|---|---|---|---|
| 2,271,336 A | 1/1942 | Goldsmith | |
| 2,678,606 A | 5/1954 | Watson | |
| 2,926,970 A | 3/1960 | Clark | |
| 3,170,646 A | 2/1965 | Springer | |
| 3,215,083 A | 11/1965 | Sarles et al. | |
| 3,267,869 A | 8/1966 | Vartapetov et al. | |
| 3,945,695 A | 3/1976 | Speakman | |
| 3,975,117 A | 8/1976 | Carter | |
| 4,244,675 A | 1/1981 | Bower | |
| 4,513,215 A | 4/1985 | Del Serra | |
| 4,515,993 A | 5/1985 | Mackenzie | |
| 4,781,531 A | 11/1988 | James | |
| 5,128,573 A | 7/1992 | Liu et al. | |
| 5,160,420 A | 11/1992 | Wilson | |
| 5,184,945 A | 2/1993 | Chi-Wei | |
| 5,207,560 A | 5/1993 | Urban | |
| 5,209,577 A | 5/1993 | Swatek | |
| 5,320,431 A | 6/1994 | Kallenberger | |
| 5,722,812 A | 3/1998 | Knox et al. | |
| 5,765,950 A | 6/1998 | Eno et al. | |
| 5,845,709 A | 12/1998 | Mack et al. | |
| 6,017,184 A | 1/2000 | Aguilar et al. | |
| 6,068,444 A | 5/2000 | Sheith | |
| 6,106,224 A | 8/2000 | Sheith et al. | |
| 6,167,965 B1 | 1/2001 | Bearden et al. | |
| 6,309,174 B1 | 10/2001 | Oklejas, Jr. et al. | |
| 6,547,514 B2 | 4/2003 | Lee | |
| 6,676,366 B2 | 1/2004 | Kao | |
| 7,530,391 B2 | 5/2009 | Hall et al. | |
| 7,549,837 B2 | 6/2009 | Hackworth et al. | |
| 7,575,413 B2 | 8/2009 | Semple et al. | |
| 7,909,090 B2 | 3/2011 | Reid | |
| 8,066,476 B2 | 11/2011 | Orban et al. | |
| 8,070,426 B2 | 12/2011 | Brunner et al. | |
| 8,287,235 B2 | 10/2012 | Orban et al. | |
| 8,400,035 B2 | 3/2013 | Watson | |
| 8,491,277 B2 | 7/2013 | Kawabata et al. | |
| 8,651,836 B2 | 2/2014 | Parmeter et al. | |
| 8,684,679 B2 | 4/2014 | Tetzlaff et al. | |
| 8,721,181 B2 | 5/2014 | Semple et al. | |
| 8,894,350 B2 | 11/2014 | Brunner et al. | |
| 9,017,043 B2 | 4/2015 | Parmeter et al. | |
| 9,039,356 B1 | 5/2015 | Nowitzki et al. | |
| 9,200,642 B2 | 12/2015 | Nowitzki et al. | |
| 9,325,216 B2 | 4/2016 | Parmeter et al. | |
| 9,334,865 B2 | 5/2016 | Johnson et al. | |
| 9,353,752 B2 | 5/2016 | Tetzlaff et al. | |
| 9,353,753 B2 | 5/2016 | Wilson et al. | |
| 9,500,202 B1 | 11/2016 | Davis et al. | |
| 9,534,603 B2 | 1/2017 | St. John et al. | |
| 9,816,519 B2 | 11/2017 | Nowitzki et al. | |
| 9,829,001 B2 | 11/2017 | Jayaram et al. | |
| 2002/0125777 A1 | 9/2002 | Parmeter et al. | |
| 2004/0057642 A1 | 3/2004 | New | |
| 2005/0244086 A1 | 11/2005 | Murata et al. | |
| 2009/0039722 A1 | 2/2009 | Cain et al. | |
| 2012/0020777 A1 | 1/2012 | Eslinger | |
| 2012/0257985 A1 | 10/2012 | Parmeter et al. | |
| 2013/0017075 A1 | 1/2013 | Orban et al. | |
| 2013/0209225 A1 | 8/2013 | Eslinger | |
| 2014/0140811 A1 | 5/2014 | Tetzlaff et al. | |
| 2015/0023815 A1 | 1/2015 | Tetzlaff et al. | |
| 2015/0152877 A1 | 6/2015 | Jayaram et al. | |
| 2017/0058616 A1 | 3/2017 | Lunk et al. | |
| 2018/0017066 A1 | 1/2018 | Nowitzki et al. | |
| 2018/0045209 A1 | 2/2018 | Nowitzki et al. | |

PRESS-FIT THRUST BEARING SYSTEM AND APPARATUS

CROSS REFERENCE TO RELATED APPLICATIONS

This application is a Continuation of U.S. Non-Provisional application Ser. No. 15/912,321 to Webster et al., filed on Mar. 5, 2018 entitled "PRESS-FIT THRUST BEARING SYSTEM AND APPARATUS", which claims the benefit of U.S. Provisional Application No. 62/482,061 to Webster et al., filed Apr. 5, 2017 and entitled "PRESS-FIT THRUST BEARING.

BACKGROUND OF THE INVENTION

1. Field of the Invention

Embodiments of the invention described herein pertain to the field of electric submersible pump assembly bearings. More particularly, but not by way of limitation, one or more embodiments of the invention enable a press-fit thrust bearing.

2. Description of the Related Art

Fluid, such as gas, oil or water, is often located in underground formations. When pressure within the well is not enough to force fluid out of the well, the fluid must be pumped to the surface so that it can be collected, separated, refined, distributed and/or sold. Centrifugal pumps are typically used in electric submersible pump (ESP) applications for lifting well fluid to the surface. Centrifugal pumps impart energy to a fluid by accelerating the fluid through a rotating impeller paired with a stationary diffuser. A rotating shaft runs through the central hub of the impeller and diffuser. A motor upstream of the pump turns the shaft, and the impeller is keyed to the shaft, causing the impeller to rotate with the shaft.

Each rotating impeller and stationary diffuser pair is called a "stage". The impeller's rotation confers angular momentum to the fluid passing through the pump. The angular momentum converts kinetic energy into pressure, thereby raising the pressure on the fluid and lifting it to the surface. Multiple stages of impeller and diffuser pairs may be used to further increase the pressure lift. The stages are stacked in series around the pump's shaft, with each successive impeller sitting on a diffuser of the previous stage.

A conventional ESP assembly includes, from bottom to top, a motor, seal section, intake section, and multi-stage centrifugal pump. Production tubing carries the pumped fluid from the centrifugal pump to the well's surface. The assembly components each have a shaft running longitudinally through their centers that are connected to one another and rotated by the motor. In gassy wells, a gas separator or charge pump may also be included in the assembly. For example, a gas separator may act as the intake of the assembly. In such instances, the gas separator compresses the gaseous fluid and then attempts to separate any unsaturated gas before the fluid passes into the centrifugal pump. Gas separators sometimes include impeller and diffuser stages to increase the pressure of the fluid during compression and separation of gases. Similarly, charge pumps are also sometimes used in tandem with a primary centrifugal pump in gassy wells, and may also employ stages. Charge pumps may be employed as a lower tandem pump to boost fluid before it enters the production pump by reducing the net positive suction head required, allowing the production pump to operate in low inflow pressure conditions that may be caused by gas ingress.

During operation, whether in a pump, charge pump or gas separator, pump assembly stages are subject to axial forces in the upward and downward directions, conventionally referred to as "thrust." Downward force or "downthrust" is a result of a portion of the impeller discharge pressure acting on the top of the impeller. Upward force or "upthrust" is a result of a portion of the impeller discharge pressure acting against the bottom of the impeller. A second upward force is the force produced by the momentum of the fluid making its turn in the impeller passageway. Pump assembly stages are also subject to radial forces that can cause the shaft to become misaligned.

To carry the thrust of the pump, hardened-ceramic thrust bearings are sometimes employed in pump stages. The thrust bearings include a bushing that is pressed into the wall of the diffuser. A flanged sleeve is keyed to the shaft inward of the stationary bushing. As the sleeve rotates inside the non-rotating bushing, a thin layer of fluid forms in between the sleeve and bushing of the bearing set to provide fluid film lubrication and carry thrust loads. The sleeve may further act as a radial support bearing. To handle both upthrust and downthrust, two opposing bearing sets are typically employed one above the other, as illustrated in FIG. 1. The flange of one conventional sleeve 100 faces upwards inside a first conventional bushing 105, with its top surface handling downthrust, whereas the flange of the second conventional sleeve 100 inside a second conventional bushing 105 faces downwards, with its bottom surface handling upthrust. Not only are the dual bearing sets expensive due to the cost of the hardened ceramic material of the bearings, but the arrangement requires special tooling of the diffuser to create the bushing seats. Two bores must be created from opposing directions, and the special tooling increases machining costs and increases the possibility of bushing misalignment or runout issues. In addition, the use of two separate bushings leaves the upthrust bushing particularly susceptible to dislodgment.

Stationary bushings are traditionally tube-shaped or shaped like a hollowed cylinder. A conventional bushing 105 is illustrated in FIG. 2. The bushing must remain stationary as the sleeve rotates, and as such, these bushings must be securely pressed into the inner wall of the diffuser exit. Typically, bushings are tightly pressed into the diffuser bore with an interference fit. The outer diameter of the bushing is larger than the diffuser bore, typically by about 0.001-0.003 inches (0.025-0.076 mm), and is inserted using a lead in chamfer. Frictional forces between the bushing and the surrounding diffuser attempt to keep the bushing from slipping out of place.

During operation of an ESP assembly, the assembly experiences a significant increase in temperature. In a typical instance, an ESP assembly may be about 75° F. (23.9° C.) when assembled, but increase to 200-300° F. (93.3-148.9° C.). during downhole operations. Some types of ESP systems such as steam assisted gravity drainage systems reach temperatures as high as 550° F. (287.8° C.) during downhole operations. Since the various pump components are made of different materials from one another, those materials expand at different rates as the pump increases in temperature. Conventionally, diffusers are made of Ni-resist, an austenitic iron alloy, and bushings are made of a hardened ceramic material such as tungsten carbide, silicon carbide or titanium carbide. The Ni-resist diffuser has a much higher thermal expansion coefficient than the composite bushing, causing the diffuser to expand faster than the press-fit bushing. The result is that the press-fit on the bushing relieves and the bushing dislodges or rotates. Once the bushing dislodges or rotates, it can cause misalignment or undesirable movement that can degrade the overall performance and/or operational life of the pump.

One approach to combating the dislodgement of ESP bushings due to thermal expansion has been to place a Ni-resist retaining ring above the bushing. The retaining ring is held in place by insertion into a groove. Because the retaining ring is the same material as the diffuser, it grows in size with the diffuser, keeping the bushing from sliding upwards as the temperature increases. However, this approach is not possible when the bearing needs to provide thrust protection, as the retaining ring cannot carry any thrust load. Another approach has been to include a flange around the top or bottom end of the bushing to prevent axial dislodgment of the bushing. However, the bushing flange only provides thrust protection in a single direction and can interfere with placement of a retaining ring, requiring a tradeoff between dislodgement protection and thrust protection. In addition, both conventional retaining rings and conventional bushing flanges do not address the problem of bushing spin.

As is apparent from the above, current ESP stages employing press-fit thrust bearings suffer from many deficiencies. Therefore, there is a need for an improved press-fit thrust bearing system and apparatus.

BRIEF SUMMARY OF THE INVENTION

One or more embodiments of the invention enable a press-fit thrust bearing system and apparatus.

A press-fit thrust bearing system and apparatus is described. An illustrative embodiment of a press-fit thrust bearing system includes a non-rotating diffuser paired with a rotatable impeller to form a stage, the rotatable impeller secured to a rotatable shaft of a centrifugal pump, the stage including a single bushing including a protruding band extending around an intermediate portion of the single bushing and outward towards the diffuser, the protruding band press-fit to the diffuser, and two rotatable flanged sleeves paired with the single bushing, wherein the two rotatable flanged sleeves and the bushing together form a thrust bearing set that carries both upthrust and downthrust of the centrifugal pump. In some embodiments, a bore of the non-rotating diffuser includes a shoulder that mates with the protruding band and a portion of the bushing below the protruding band. In certain embodiments the press-fit thrust bearing system further includes a non-rotating guide sleeve extending around an outer diameter of the bushing above the protruding band, the guide sleeve extending from a top edge of the protruding band towards a top face of the single bushing and the non-rotating guide sleeve press-fit to the diffuser. In certain embodiments, the diffuser and the guide sleeve are each made of same material. In some embodiments, the protruding band extends 360° around the outer diameter of the single bushing and includes a pocket, and the guide sleeve includes a projections that mates with the pocket. In certain embodiments, the protruding band is divided by a pair of axial channels. In some embodiments, the press-fit thrust bearing system further includes a non-rotating guide sleeve extending around an outer diameter of the bushing one of above or below the protruding band, the non-rotating guide sleeve press fit to the diffuser, and wherein the guide sleeve includes a pair of projections, each projection of the pair of projections mating with one axial channel of the pair of axial channels. In certain embodiments, the protruding band is a tab, and further including a non-rotating guide sleeve extending around an outer diameter of the bushing one of above or below the tab, the non-rotating guide sleeve press-fit to the diffuser wherein the guide sleeve includes an opening that mates around the tab. In some embodiments, the tab is rectangular and the opening mates around three sides of the tab. In certain embodiments, a first flange of a first flanged sleeve of the two rotatable flanged sleeves extends over a top face of the single bushing, and a second flange of a second flanged sleeve of the two rotatable flanged sleeves extends over a bottom face of the single bushing. In some embodiments, the top face of the bushing is a first thrust surface that handles the downthrust and the bottom of the bushing is a second thrust surface that handles the upthrust. In certain embodiments, the two rotatable flanged sleeves are keyed to the rotatable shaft. In some embodiments, the centrifugal pump includes a plurality of the stages, and wherein at least two diffusers of the plurality of stages each including the single bushing press-fit thereto.

An illustrative embodiment of a press-fit thrust bearing set includes at least one rotatable flanged sleeve, a bushing press-fit to a diffuser outward of the at least one rotatable flanged sleeve, the bushing including a tubular portion, and a protruding band extending circumferentially around at least a portion of an intermediate section of the tubular portion and outward towards the diffuser, the protruding band press-fit to the diffuser, a first outer surface portion of the bushing press fit to the diffuser, the first outer surface portion adjacent a first edge of the protruding band and extending towards a first thrust surface of the bushing, a non-rotatable guide sleeve extending circumferentially around a second outer surface portion of the bushing, the second outer surface portion extending from a second edge of the protruding band towards a second thrust surface of the bushing, the guide sleeve pressed between the second outer surface portion of the bushing and the diffuser, and at least one flange of the at least one rotatable flanged sleeves extending over one of the first thrust surface of the bushing, the second thrust surface of the bushing, or a combination thereof. In some embodiments, the at least one flange includes two flanges, and wherein a first flange extends over the first thrust surface of the bushing and a second flange extends over the second thrust surface of the bushing. In certain embodiments, the at least one rotatable flanged sleeve includes a first rotatable flanged sleeve and a second rotatable flanged sleeve, and a first end of the first rotatable flanged sleeve opposite the first flange and a second end of the second rotatable flanged sleeve opposite the second flange extend inside the bushing. In some embodiments, the bushing includes a second protruding band extending circumferentially around the tubular portion and inwards towards a drive shaft, the second protruding band interposed between the first end of the first bearing sleeve and the second end of the second bearing sleeve. In certain embodiments, the first thrust surface is a bottom face of the bushing, the second thrust surface is a top face of the bushing, and the first outer surface portion of the bushing extends from below the protruding band towards the bottom face of the bushing. In some embodiments, the first thrust surface is a top face of the bushing, the second thrust surface is a bottom face of the bushing, and the first outer surface portion of the bushing extends from above the protruding band towards the top face of the bushing. In certain embodiments, the protruding band includes a first pocket, and the guide sleeve includes a first projection that interlocks within the first pocket. In some embodiments, the press-fit thrust bearing set further includes a second pocket spaced 180° from the first pocket, and the guide sleeve including a second projection that interlocks with the second pocket. In certain embodiments, the protruding band is divided by a channel, and the guide sleeve includes a projection that mates within the channel. In some embodiments, the at least one rotatable flanged sleeve are keyed to the drive shaft. In certain embodiments, the diffuser is paired with an impeller to form a stage of an electric submersible pump. In some embodiments, an inner diameter of the diffuser is stepped to mate with the press fit protruding band and the first outer surface portion of the bushing.

An illustrative embodiment of an improved press-fit thrust bearing system for an electric submersible pump (ESP) includes at least one protruding band extending circumferentially around a midsection of a bushing, the at least one protruding band extending one of inward towards a drive shaft, outward towards a diffuser or a combination thereof. In some embodiments, the at least one protruding band extends outwards towards the diffuser and is press-fit into the diffuser to prevent dislodgment of the bushing. In certain embodiments, a bore of the diffuser includes a shoulder that mates with the at least one protruding band and a portion of the bushing below the at least one protruding band. In some embodiments, the improved press-fit thrust bearing system further includes a guide sleeve around the bushing one of above or below the at least one protruding band, the guide sleeve press-fit to the diffuser and interlocking with one of the at least one protruding band to prevent rotation of the bushing. In certain embodiments, the guide sleeve includes a projection, the one of the at least one protruding band has a notch and wherein the projection mates with the notch to interlock the guide sleeve with the one of the at least one protruding band. In some embodiments, the guide sleeve includes Ni-resist, the bushing includes one of tungsten carbide, silicon carbide or titanium carbide and the diffuser includes Ni-resist. In certain embodiments, the improved press-fit thrust bearing system further includes a pair of rotatable bearing sleeves extending inwards of the bushing and keyed to the drive shaft. In some embodiments, the protruding band extends inward towards the drive shaft and between the pair of rotatable bearing sleeves. In certain embodiments, the pair of rotatable bearing sleeves are flanged and carry thrust of the ESP. In some embodiments, the bushing includes a first protruding band extending inward towards the drive shaft and a second protruding band extending outwards towards the diffuser. In certain embodiments, the first protruding band extending inwards towards the drive shaft is an insert held against rotation by an elastomeric ring. In some embodiments, the at least one protruding band extends outwards towards the diffuser, and the at least one protruding band is divided by at least one axial channel extending along an outer surface of the bushing. In certain embodiments, the improved press-fit thrust bearing system further includes a non-rotating guide sleeve around the bushing and press-fit to the diffuser above the at least one protruding band, the non-rotating guide sleeve including a projection that mates with the at least one axial channel.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

Figure 1:
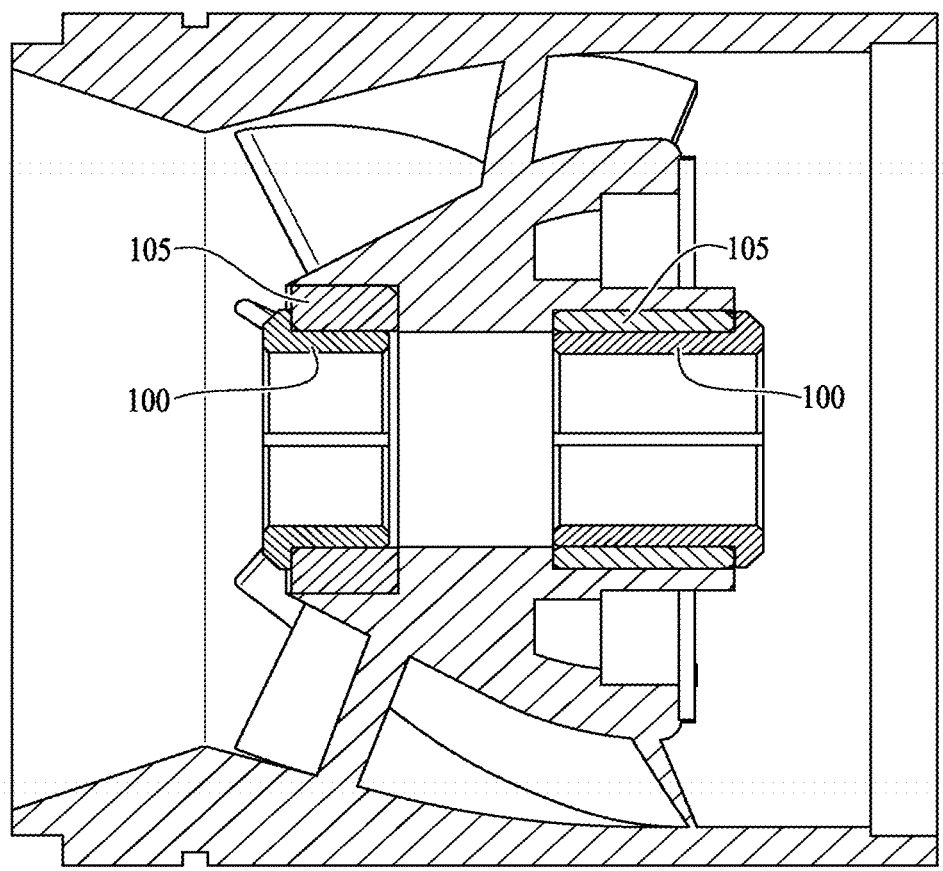
FIG. 1 is a conventional dual bearing set arrangement of the prior art.
Figure 2:
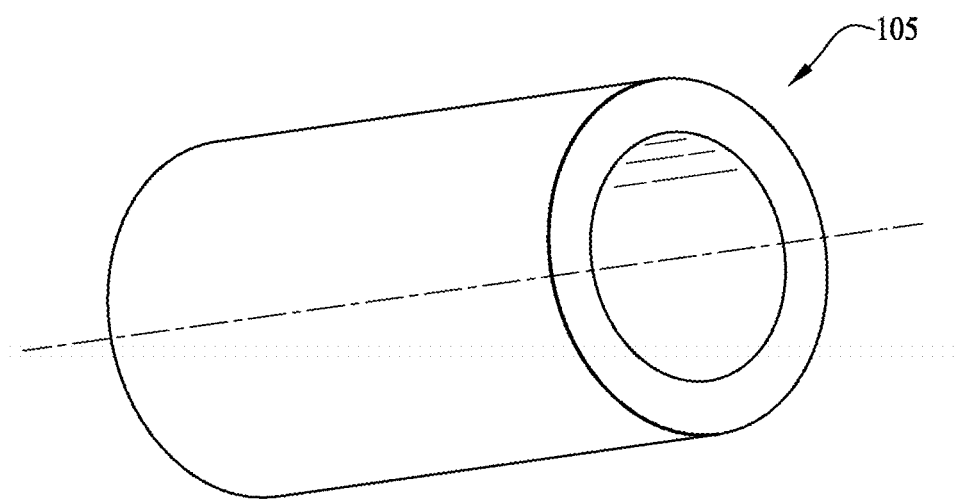
FIG. 2 is a conventional bushing of the prior art.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A press-fit thrust bearing system and apparatus will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a stage includes one or more stages.

"Coupled" refers to either a direct connection or an indirect connection (e.g., at least one intervening connection) between one or more objects or components. The phrase "directly attached" means a direct connection between objects or components.

As used herein, the term "outer," "outside" or "outward" means the radial direction away from the center of the shaft of the electric submersible pump (ESP) assembly and/or the opening of a component through which the shaft would extend. As used herein, the term "inner", "inside" or "inward" means the radial direction toward the center of the shaft of the ESP assembly and/or the opening of a component through which the shaft would extend.

As used herein the terms "axial", "axially", "longitudinal" and "longitudinally" refer interchangeably to the direction extending along the length of the shaft of an ESP assembly component such as a multi-stage centrifugal pump, gas separator or charge pump.

"Downstream" refers to the longitudinal direction with the principal flow of lifted fluid through a well when the pump assembly is in operation. By way of example but not limitation, in a vertical downhole ESP assembly, the downstream direction may be towards the wellhead.

"Upstream" refers to the longitudinal direction opposite the principal flow of lifted through a well when the pump assembly is in operation. By way of example but not limitation, in a vertical downhole ESP assembly, the upstream direction may be opposite the wellhead.

As used herein, the term "top" with respect to an ESP assembly component refers to the downstream-most side of the component, without regard to whether the well is horizontal, vertical, bent or angled. The term "bottom" means the upstream-most side of the component, without regard to whether the well is horizontal, vertical, bent or angled.

One or more embodiments provide a press-fit thrust bearing system for centrifugal pumps. While illustrative embodiments are described in terms of an ESP oil and/or gas downhole pumping embodiment, nothing herein is intended to limit the invention to that embodiment. Illustrative embodiments may be employed in any application requiring both upthrust and downthrust shaft support and/or may be equally applicable to horizontal surface pumps, mixed flow and/or radial flow stages.

Illustrative embodiments may provide a thrust handling bushing that is resistant to both dislodgement and rotation despite operation in high temperature environments such as 200-550° F. (93.3-287.8° C.) and/or thermal expansion of the surrounding diffuser. The bushing may be press-fit to the diffuser rather than compliant. A single bushing may carry both upthrust and downthrust loads, and may increase the operational flow rate and/or thrust handling capability of the ESP assembly of illustrative embodiments. The bushing may be paired with two rotatable flanged sleeves, one flanged sleeve for each thrust face of the bushing. The diffuser machining process for the single bushing seat may be simplified by machining the diffuser bore from a single side and eliminating the need for special tooling. Elimination of a second bushing may also reduce the cost of the pump assembly by eliminating the amount of hardened ceramic material needed to provide shaft support. In addition, a decrease in the number of parts needed as compared to the conventional double bushing configuration for each stage, may simplify assembly of the pump stages and field installation.

Illustrative embodiments may provide a bushing having a protruding band circumferentially around its midsection, similar to a belt. In some embodiments, the band may extend around the entire circumference of the bushing. In certain embodiments, the band may be divided by an axial channel or may extend around only a portion of the bushing to form a protruding tab. The protruding band may extend outwards towards a diffuser and be pressed into the diffuser. The bushing seat in the diffuser bore may include a shoulder such that the narrower portion of the bushing, below the protruding band, may also be pressed into the diffuser. A static guide sleeve may extend around the bushing above the protruding band. In some embodiments, the positions of the narrower portion of the bushing and the guide sleeve may be reversed.

The non-rotatable guide sleeve may be made of same material as the diffuser and expand at substantially the same rate during temperature increases. The protruding band may have a female pocket, notch and/or axial channel that interlocks with a male projection on the guide sleeve. The interlock may prevent rotation of the bushing despite temperature increase. In some embodiments, the protruding band may be a male tab that interlocks with a female recession in the guide sleeve to prevent rotation of the bushing.

Both the top face and bottom face of the bushing may carry thrust, with the top face carrying downthrust and the bottom face carrying upthrust. Two rotatable flanged sleeves may be paired with the single bushing. Each of the flanged sleeves may rotate inward of the bushing and lie in opposing directions axially. One flange of each bearing sleeve may extend over a thrust face of the bushing. In some embodiments, a second protruding circumferential band may extend inward around the midsection of the bushing towards the drive shaft. The inward protruding band may extend between the ends of the two sleeves inward of the bushing, and may provide an additional thrust face should the top or bottom face of the bushing fail due to wear.

Figure 3A:
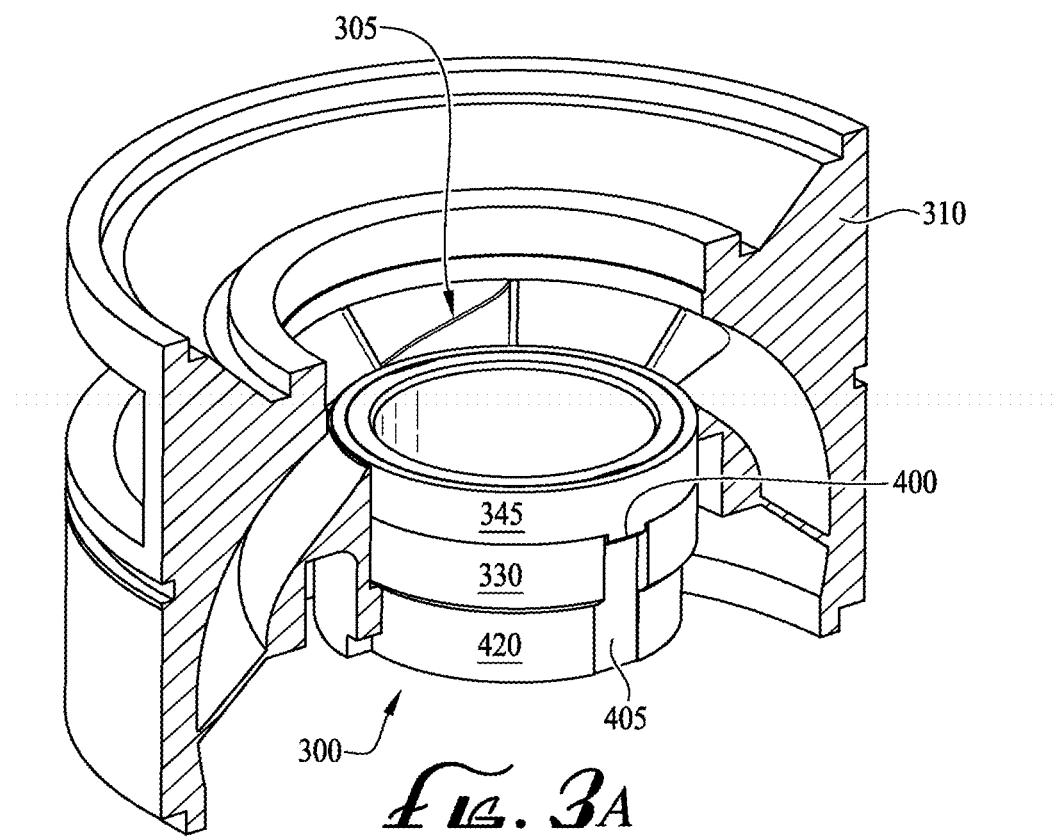
FIG. 3A is a perspective view of a press-fit thrust bearing system of an illustrative embodiment.
Figure 3B:
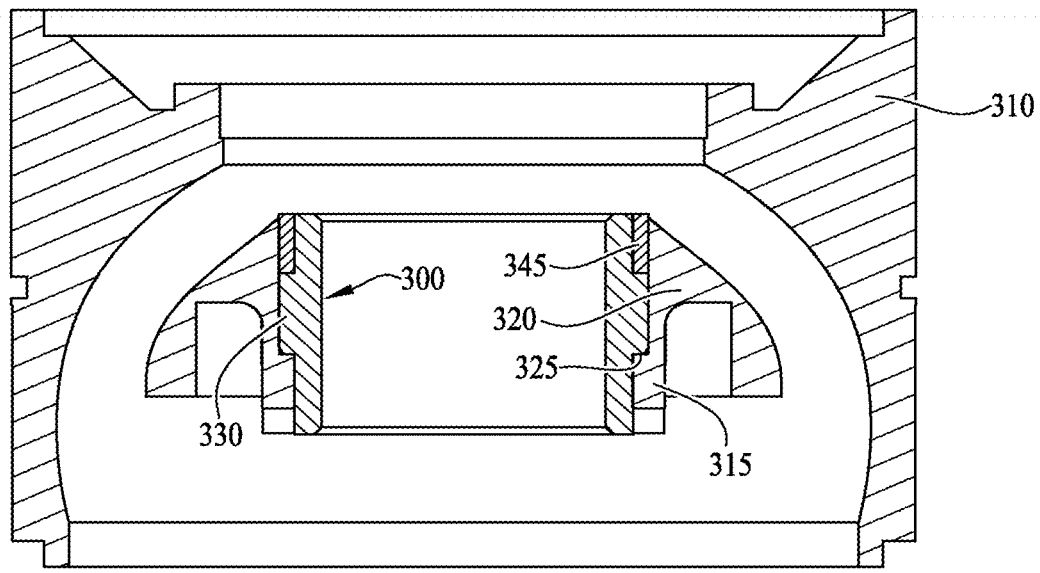
FIG. 3B is a cross sectional view of a press-fit thrust bearing system of an illustrative embodiment.

FIG. 3A and FIG. 3B illustrate a press-fit bushing of an illustrative embodiment. The bushing of illustrative embodiments may be employed in the base and/or head of a multi-stage centrifugal pump, within one, a few or every diffuser, within every sixth diffuser, within every third diffuser and/or at any location within a pump assembly where shaft support may be desired. Bushing 300 may generally be annular and/or tubular in shape and be secured by interference fit (press-fit) within bore 305 of diffuser 310. Diffuser 310 may be an austenitic cast iron alloy, such as type 1 Ni-resist, stainless steel or another material having similar properties. As shown in FIG. 3A and FIG. 3B, bushing 300 is press-fit into the fluid exit of diffuser 310. Diffuser bore 305 may be machined from a single side of diffuser 310, either the top or bottom. Two bores may be created from a single side to form stepped bore 305 having a stepped inner diameter that forms a bushing seat. In the embodiment shown in FIG. 3B, bore 305 inner diameter increases towards the top of diffuser 300 such that narrow portion 315 of bore 305 may have a smaller inner diameter than wide portion 320 of bore 305. In one illustrative example, narrow portion 315 may have an opening of about 1.3 inches (3.3 cm) in diameter whereas wide portion 320 may have an opening of about 1.43 (3.6 cm) inches in diameter. Dimensions may vary depending on the pump size and type. The change in inner diameter of diffuser 300 from narrower to wider may form shoulder 325 on inner diameter of diffuser 300 at the interface between narrow portion 315 and wide portion 320.

Figure 4A:
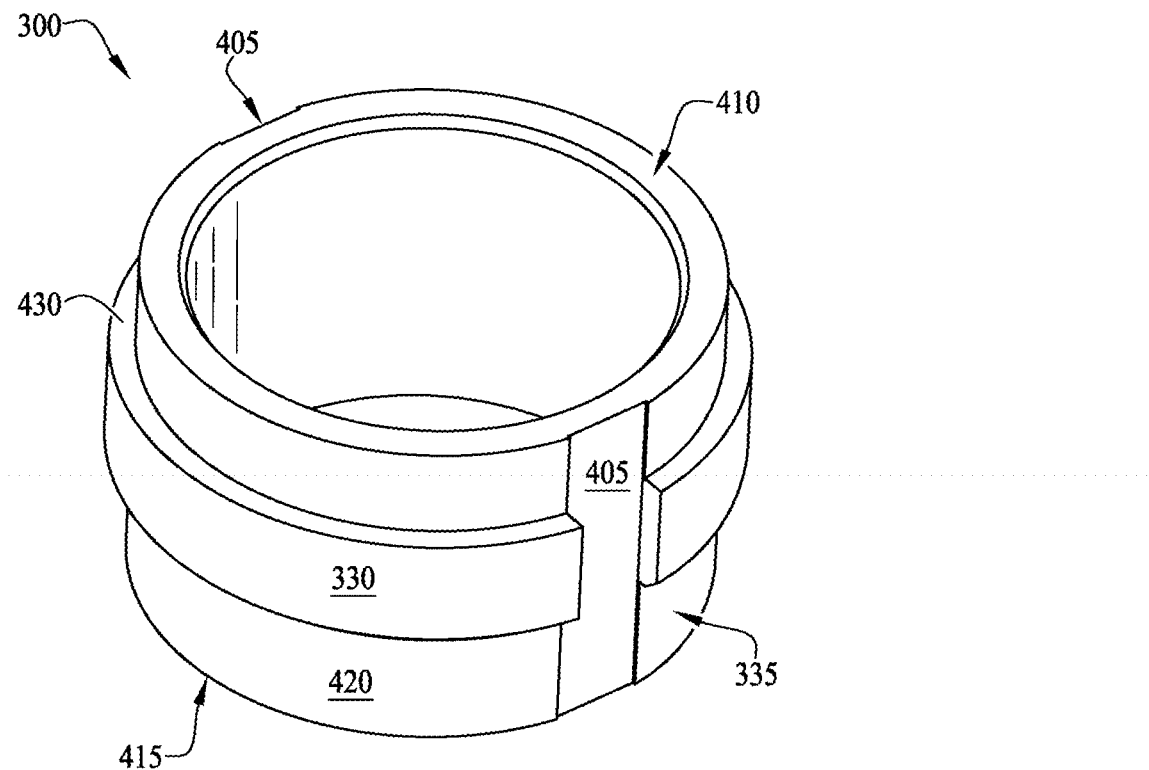
FIGS. 4A-4C are perspective views of a bushing of illustrative embodiments.
Figure 4B:
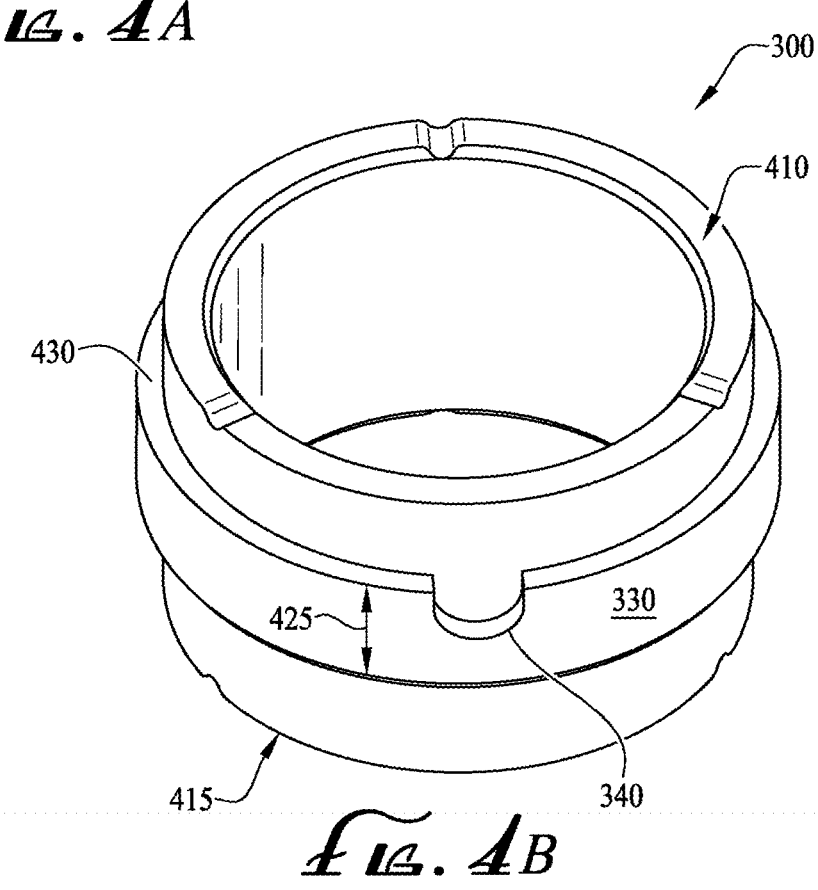
Figure 4C:
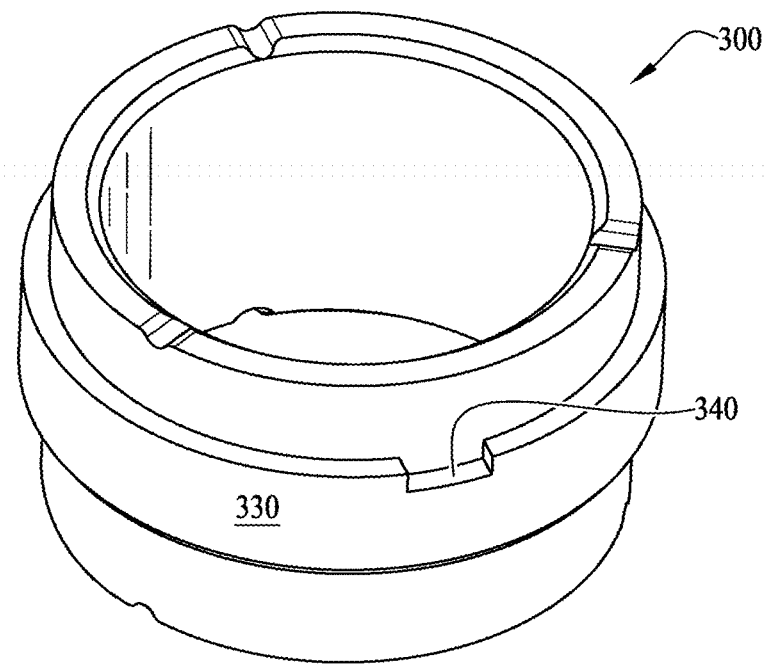

Turning to FIGS. 4A-4C, bushing 300 may be a hardened ceramic, commonly referred to in the art of ESP pumps as "abrasion resistant trim" or "AR trim", such as tungsten carbide, silicon carbide or titanium carbide. Bushing 300 may be press-fit in diffuser bore 305. Bushing 300 may include outward protruding band 330 around outer diameter 335 of bushing 300. Outer band 330 may extend circumferentially around outer diameter 335 at or proximate the center, midsection, equator, middle and/or midline of bushing 300 like a belt. In some embodiments, outer band 330 may be shifted upwards or downwards from the center of bushing 300 in a longitudinal direction, although outer band 330 should not reach bushing top face 410 or bushing bottom face 415, since at least a portion of outer diameter 335 of bushing 300 should extend both above and below outer band 330. Protruding band 330 may be integral with bushing 300 and/or comprise a hard carbide material.

Outer diameter 335 of bushing 300 may be increased by about 10% to form outer band 330 and/or at the location of outer band 330. In this example, where lower portion 315 of bushing seat has an opening of about 1.3 inches (3.30 cm) in diameter, the portion 420 of bushing 300 that does not include outer band 330 may similarly have an outer diameter of about 1.3 inches (3.30 cm), although outer diameter 335 of bushing should be about 0.001-0.003 inches (0.025-0.076 mm) larger than the inner diameter of bore lower portion 315 to allow for the interference fit. In this same example, the portion of outer diameter 335 of bushing 300 including outer band 330 may have an outer diameter 335 of about 1.43 inches (3.63 cm) although still 0.001-0.003 inches (0.025 mm-0.076 mm) larger than bore 305 at the location of outer band 330. In exemplary embodiments, outer band 330 may have a height 425 about a third or about a quarter of the height of bushing 300. Outer band 330 and the portion 420 of bushing 300 below band 330 may be press fit to bore 305 such that bushing 300 interlocks and/or mates with shoulder 325. When bushing 300 is pressed into diffuser 310, the top or bottom edge 430 of outer band 330 may rest on shoulder 325 of diffuser 310. Outer band 330 may also include pocket 340, which may be a female socket that may be cast, machined or pressed into band 330. Bushing 300 with integral band 330 may be cast, pressed and/or sintered to the desired shape. Pocket 340 may be rounded, as shown in FIG. 4B or may be a square or rectangular notch as shown in FIG. 4C. One or more pockets 340 may be spaced around band 330. For example, two pockets 340 may be spaced 180° apart or three pockets 340 may be spaced 120° apart.

Figure 6:
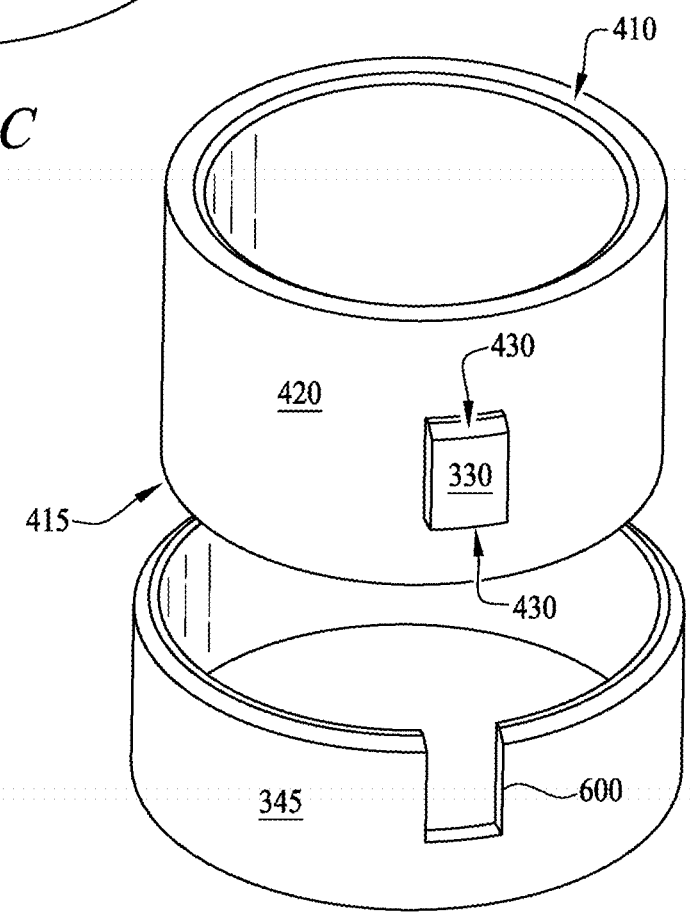
FIG. 6 is a perspective view of a bushing and guide sleeve of an illustrative embodiment.

As shown in FIG. 4B and FIG. 4C, in some embodiments, protruding band 330 may extend 360° around the midsection of bushing 300. As shown in FIG. 4A and FIG. 6, in certain embodiments, protruding band 330 may extend around a portion of the circumference of bushing 300 less than 360°. Turning to FIG. 4A, band 330 may be divided by one or more axial channels 405. In FIG. 4A, band 330 is divided by two axial channels 405, which axial channels 405 are spaced 180° apart. Channel 405 may extend an arc length and/or width formed by 15°, 20°, 25° or a similar angle around outer diameter 335 of bushing 300. For example, each portion of protruding band 330 may extend 160° around the circumference of bushing 300, and each of two axial channels 405 may be 20° circumferentially around bushing 300. Channel 405 may extend axially along the height of bushing 300 between top face 410 and bottom face 415 of bushing 300 and may be a recession or groove in the outer surface of bushing 300. When channel 405 is included, channel 405 may replace pocket 340 as the female socket that mates with guide sleeve 345 (shown in FIG. 3A) to prevent rotation of bushing 300. Axial channel 405 may be recessed into outer diameter 335 of bushing 300, for example recessed about 0.06 inches (0.15 cm), or may be flush with outer diameter 335 and/or may be a space in or cutout from band 330.

Returning to FIG. 3A and FIG. 3B, static guide sleeve 345 maybe surround bushing 300 above outer band 330. Guide sleeve 345 may be secured by interference fit between bushing 300 and diffuser 310 and does not rotate. Guide sleeve 345 may be Ni-resist and/or of same material as diffuser 310 such that guide sleeve 345 expands in response to temperature increase at the same rate or about the same rate as diffuser 310. Guide sleeve 345 may extend circumferentially around bushing 330 and may be seated on the top edge 430 of outer band 330. Guide sleeve 345 may be annular and/or cylindrical, but more tubular in shape than a conventional retaining ring. Guide sleeve 345 may be similar in shape and size to outer band 330. Guide sleeve 345 may extend from edge 430 of outer band 330 to just shy of bushing top face 410 and/or to the edge of bushing top face 410. Top face 410 of bushing 300 may carry downthrust loads without interference from guide sleeve 345, which may be seated outwards of bushing 300 rather than above it. Since guide sleeve 345 does not carry thrust, guide sleeve 345 should not extend over top face 410 or bottom face 415. When placed around bushing 300, guide sleeve 345 may have an outer diameter the same or similar to outer band 330, such that the outer surface of guide sleeve 345 is flush with band 330 and/or pressed into bore 305 above outer band 330.

In some embodiments, guide sleeve 345 may extend below outer band 330, rather than above outer band 330, in which instance, the orientation of shoulder 325 and/or the position of wide portion 320 and narrow portion 315 may be inverted. Where the ESP pump runs in downthrust, such as when there is a lower flow rate, it may be preferable to place guide sleeve 345 above band 330. Alternatively, if the pump runs in upthrust, such as during operation in a gaseous environment, it may be preferable to place guide sleeve 345 below outer band 330. The shape and/or type of diffuser 310 may also be taken into consideration in determining whether guide sleeve 345 may be placed above or below band. For example, the location of bore 305 having more diffuser material may allow a more solid connection between guide sleeve 345 pressed into diffuser bore 305, without risk of deformation of diffuser 310. For ease of illustration and so as not to obscure the invention, illustrative embodiments are primarily described in terms of guide sleeve 345 placed above band 330, however those of skill in the art may appreciate that guide sleeve 345 may be placed below band 330 and the features described herein inverted and/or modified accordingly.

Figure 5:
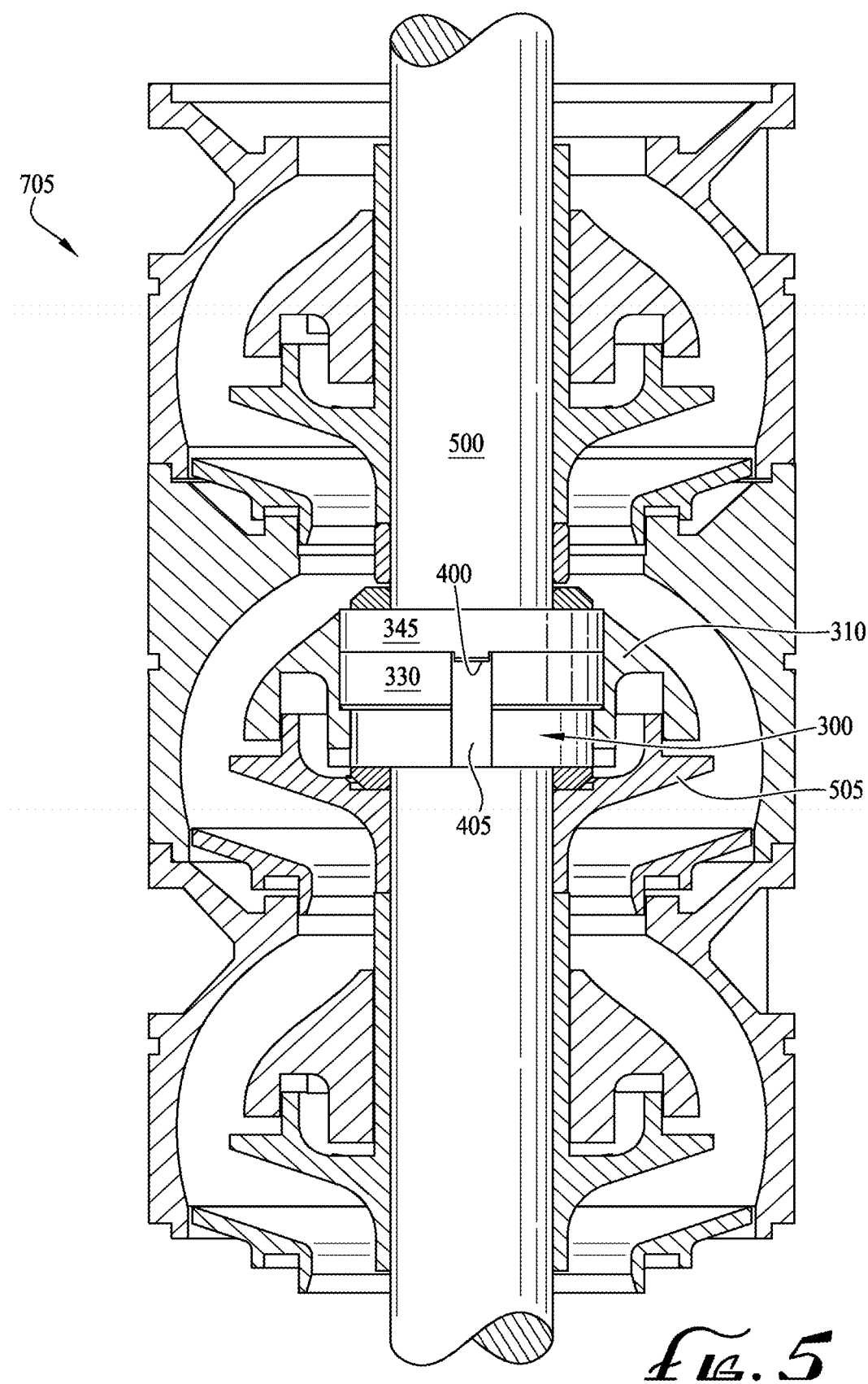
FIG. 5 is a side elevation view of a press-fit thrust bearing of an illustrative embodiment in an exemplary stage.

Guide sleeve 345 may provide both an axial lock and rotational lock against movement of bushing 300. The press fit of guide sleeve 345 may prevent bushing 300 from dislodging axially, since guide sleeve 345 may be tightly pressed into diffuser 310 with an interference fit, and being made of the same material as diffuser 310 (or a material having a similar rate of thermal expansion), may expand at same rate during temperature changes. Guide sleeve 345 may also provide mechanical interference to prevent rotation of bushing 300. FIG. 5 illustrates a rotational lock of illustrative embodiments. Guide sleeve 345 may include male projection 400 that mates with female channel 405 and/or pocket 340. The interlock between channel 405 and/or pocket 340 on the one hand, and projection 400 on the other hand, may reduce or prevent rotation of bushing 300 despite operation of the pump assembly in high temperatures up to about 550° (287° C.). Pocket 340 and/or channel 405 may be slightly larger and/or wider than projection 400 to allow for thermal expansion of guide sleeve 345 that may occur at a faster rate than thermal expansion of bushing 300.

In some embodiments, rather than male projection 400, guide sleeve 345 may include female opening 600 that mates with band 330 of bushing 300, as shown in FIG. 6. In the embodiment of FIG. 6, outer band 330 may be shaped like one or more tabs that extends around only a portion of the circumference of bushing 300, such as a length formed by an angle 15°, 20° or 25° around the circumference of bushing 300. Tab may be square or rectangular in shape, and opening 600 in guide sleeve 345 may mate and/or interlock around three sides of tab-shaped band 330, leaving the remaining edge 430 of band 330 to seat on shoulder 325. Where band 330 is tab-shaped, multiple bands 330 may be spaced around bushing 300, such as two tab-shaped bands 330 spaced 180° apart and mated into openings 600 of static guide sleeve 345.

Figure 7:
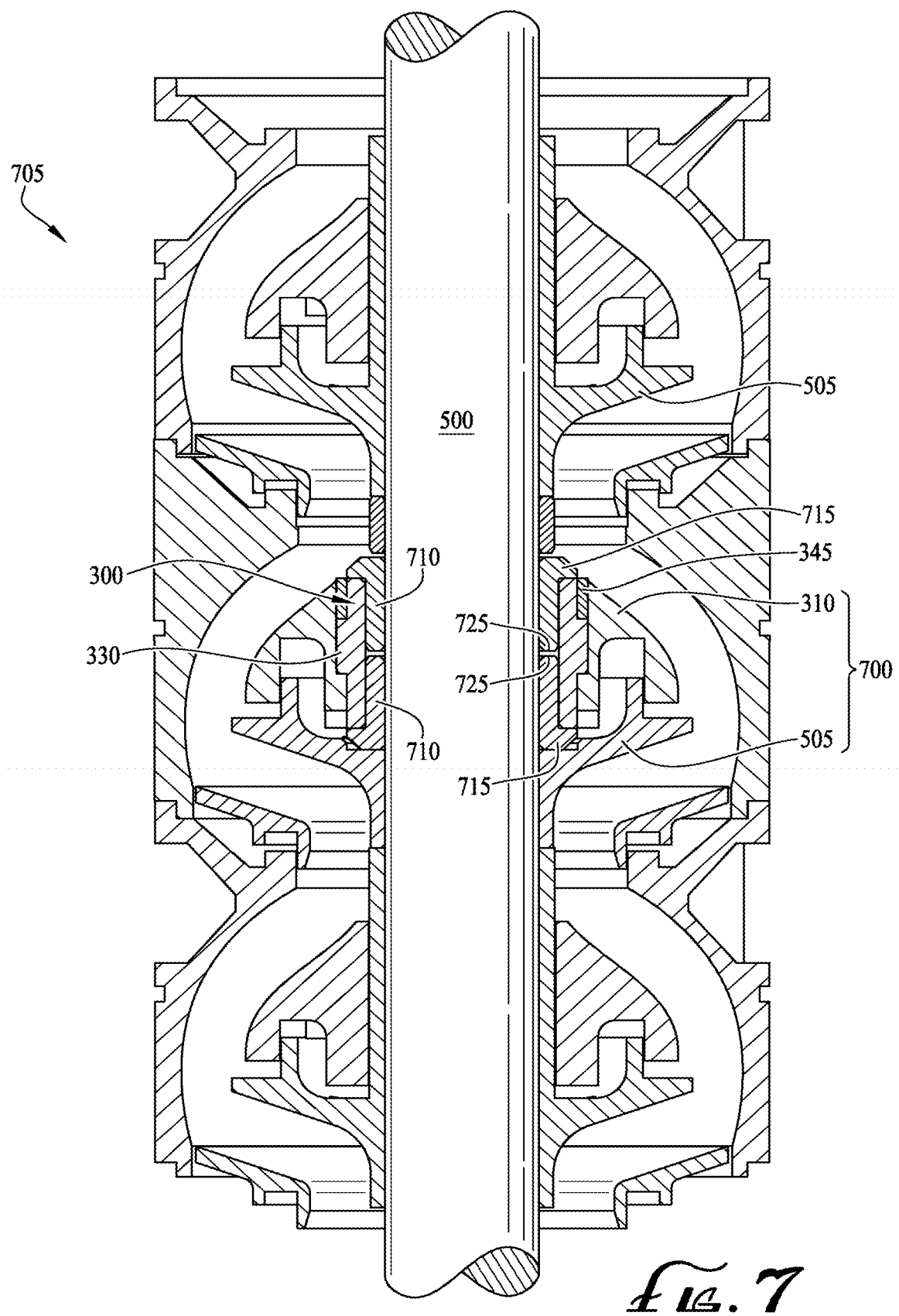
FIG. 7 is a cross sectional view of a thrust bearing set of an illustrative embodiment.

To form a bearing set of illustrative embodiments, a single bushing 300 may be paired with one or more bearing sleeves 710. FIG. 7 illustrates a bearing set of an illustrative embodiment consisting of two bearing sleeves 710 and one bushing 300. Bearing sleeve 710 may be tubular in shape and keyed or otherwise secured to shaft 500 and rotate with shaft 500. One or more bearing sleeves 710 may rotate inward of bushing 300, for example a pair of bearing sleeves 710 as shown in FIG. 7. Each bearing sleeve 710 may include flange 715 on one end of the tubular portion of bearing sleeve 710. Flange 715 may extend over a thrust face of bushing 300, such as one of top face 410 or bottom face 415. In a bearing set of illustrative embodiments including one bushing 300 and two bearing sleeves 710, one flange 715 may extend over each of top face 410 and bottom face 415, allowing the bearing set to handle both upthrust and downthrust. Flange 715 extending over top face 410 or bottom face 415 on same side of bushing 300 as guide sleeve 345 may extend over the surface of top face or 410 or bottom face 415, but not over guide sleeve 345. Ends 725 of the tubular portion of bearing sleeves 710 may face each other inside bushing 300, with a space between them. The length of the tubular portion of bearing sleeves 710 may be shortened from the conventional length, further saving on material costs. For example, each bearing sleeve 710 may be shortened by about 20% in illustrative embodiments.

Once machining of diffuser bore 305 is complete, bushing 300 and guide sleeve 345 may be pressed into bore 305 in one operation. Prior to press, guide sleeve 345 may be aligned on the shelf created by edge 430 of outer band 330. Once the press is complete, both up and down thrust flanged sleeves 710 may be added to diffuser 310 during pump stage 700 stack assembly as is well known to those of skill in the art.

FIG. 7 illustrates an exemplary stage 700 including a press-fit thrust bearing 300 of illustrative embodiments. Stages 700 may include impeller 505 and diffuser 310 pairs, with each impeller 505 stacked on a diffuser 310 of the previous stage. Impellers 505 may rotate with shaft 500, whereas diffusers 310 may remain stationary serving as a carrier for pump 705 and a supportive structure for bushing 300. Multiple stacked stages 700 may form multi-stage centrifugal pump 705, such as an ESP multi-stage centrifugal pump. One, some or all stages 700 may include bushing 300.

Figure 8:
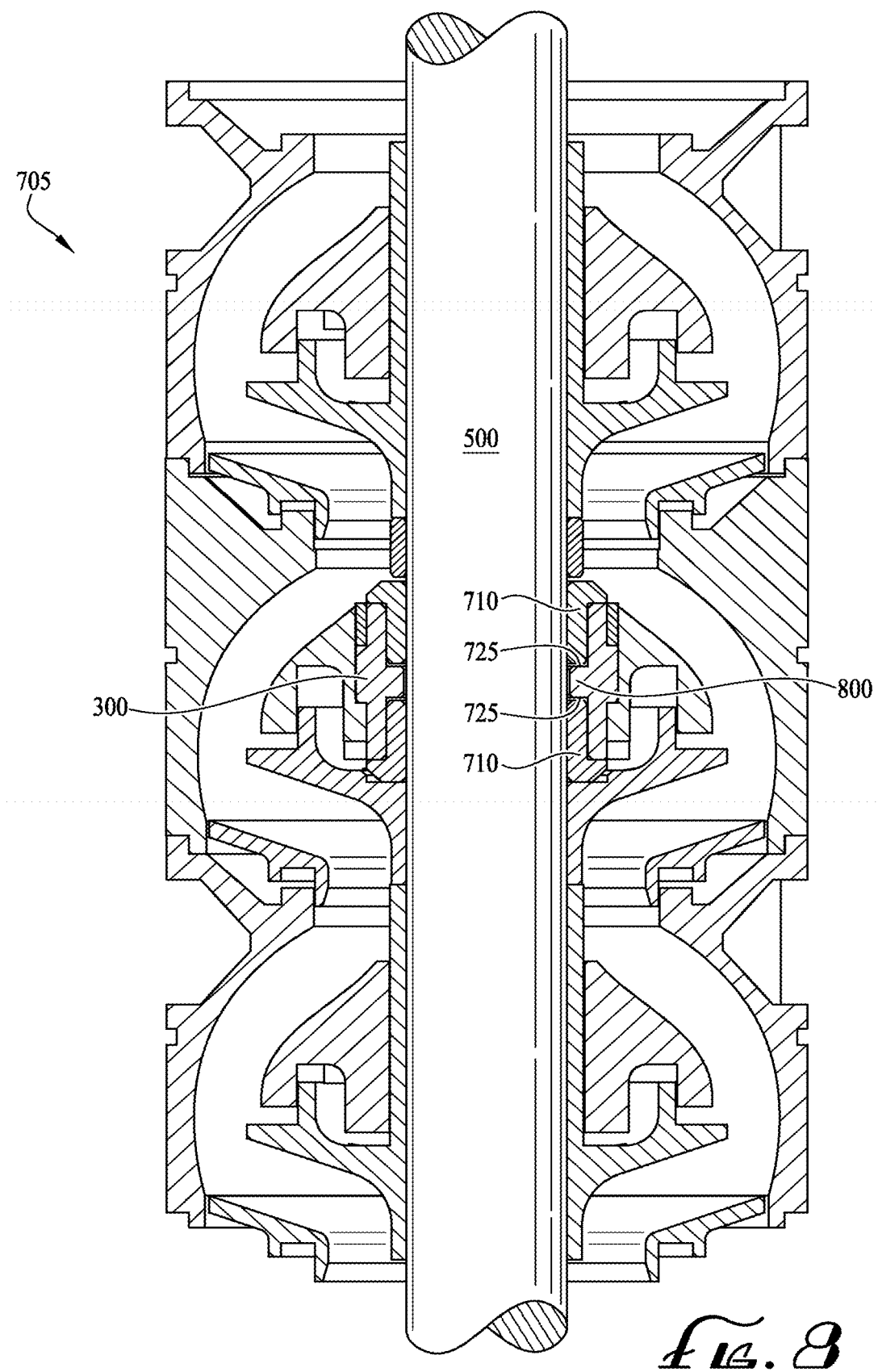
FIG. 8 is a cross sectional view of a thrust bearing set of an illustrative embodiment having a bushing with an inner band of an illustrative embodiment.

In some embodiments bushing 300 may include a band protruding inward around its midsection, which may serve as secondary, nonrotating support in the event top face 410 wears down. FIG. 8 illustrates an exemplary bushing 300 including inner band 800. Inner band 800 may extend circumferentially around bushing 300, similarly to outer band 330. Rather than protruding outwards however, inner band 800 may project inward towards shaft 500 and be interposed between ends 725 of bearing sleeves 710. In some embodiments, inner band 800 may be integral with bushing 300, or may be a non-rotating insert. Where inner band 800 is an insert, elastomeric rings may be employed to prevent inner band 800 from rotating.

Illustrative embodiments may provide a single bearing set that may carry both upthrust and downthrust loads of an ESP stage, such as a stage of a centrifugal pump, charge pump or gas separator. By handling both upthrust and downthrust, illustrative embodiments may increase the operable range of flow rates of the ESP system of illustrative embodiments. The amount of upthrust an ESP pump is capable of handling determines the upper flow rate boundary. Conversely, the amount of downthrust an ESP pump is capable of handling determines the lower flow rate boundary. For example, a conventional ESP pump that does not include conventional thrust support may have a flow rate range of 2,000-3,500 barrels per day (bpd). A conventional ESP pump under similar conditions that includes conventional bearing sets for thrust support may have a flow rate range of 500-3,500 bpd. An ESP pump including one or more press-fit thrust bearing sets of illustrative embodiments, under similar conditions as the above examples, may operate in a flow rate range of 500-4,500 bpd. Illustrative embodiments may thus expand the applications and types of wells where ESP pumps may be employed, including expanding flow rates and temperature ranges through which an ESP pump assembly of illustrative embodiments may produce fluid without failure thereby extending run life.

Illustrative embodiments may provide both up and down thrust protection utilizing just one bushing where two bushings would conventionally be employed. The bearing of illustrative embodiments may be resistant to both dislodgement and rotation in high temperature applications and/or may operate in an extended flow rate as compared to conventional ESP pumps. Illustrative embodiments may simplify machining, assembly and installation procedures and reduce material costs by reducing the amount of hardened ceramic parts needed in pump stages.

A press-fit thrust bearing system and apparatus has been described. Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. A press-fit thrust bearing system comprising:
   a non-rotating diffuser paired with a rotatable impeller to form a stage, the rotatable impeller secured to a rotatable shaft of a centrifugal pump, the stage comprising:
   a single bushing comprising a protruding band extending around an intermediate portion of the single bushing and outward towards the non-rotating diffuser, the protruding band press-fit to the non-rotating diffuser; and
   two rotatable flanged sleeves paired with the single bushing, wherein the two rotatable flanged sleeves and the single bushing together form a thrust bearing set that carries both upthrust and downthrust of the centrifugal pump; and
   a non-rotating guide sleeve extending around an outer diameter of the single bushing, the non-rotating guide sleeve press-fit to the non-rotating diffuser,
   wherein the protruding band comprises a first opening, and wherein the non-rotating guide sleeve comprises a first tab that interlocks within the first opening.

2. The press-fit thrust bearing system of claim 1, wherein a bore of the non-rotating diffuser comprises a shoulder that mates with the protruding band and a portion of the single bushing below the protruding band.

3. The press-fit thrust bearing system of claim 1, wherein the non-rotating diffuser and the non-rotating guide sleeve are each made of the same materials.

4. The press-fit thrust bearing system of claim 1, wherein the protruding band is divided by a pair of axial channels.

5. The press-fit thrust bearing system of claim 4, further comprising a non-rotating guide sleeve extending around an outer diameter of the single bushing one of above or below the protruding band, the non-rotating guide sleeve press fit to the non-rotating diffuser, and wherein the non-rotating guide sleeve comprises a pair of tabs, each tab of the pair of tabs mating with one axial channel of the pair of axial channels.

6. The press-fit thrust bearing system of claim 1, wherein the first tab is rectangular and the opening mates around three sides of the first tab.

7. The press-fit thrust bearing system of claim 1, wherein a first flange of a first flanged sleeve of the two rotatable flanged sleeves extends over a top face of the single bushing, and second flange of a second flanged sleeve of the two rotatable flanged sleeves extends over a bottom face of the single bushing.

8. The press-fit thrust bearing system of claim 7, wherein the top face of the single bushing is a first thrust surface that handles the downthrust and the bottom face of the single bushing is a second thrust surface that handles the upthrust.

9. The press-fit thrust bearing system of claim 1, wherein the two rotatable flanged sleeves are keyed to the rotatable shaft.

10. The press-fit thrust bearing system of claim 1, wherein the centrifugal pump comprises a plurality of stages, and wherein at least two diffusers of the plurality of stages each comprise the single bushing press-fit thereto.

\* \* \* \* \*